United States Patent
Rosenzweig (10) Patent No.: US 6,526,479 B2
(45) Date of Patent: Feb. 25, 2003

(54) METHOD OF CACHING WEB RESOURCES

(75) Inventor: Michael D. Rosenzweig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/860,969

(22) Filed: May 18, 2001

(65) Prior Publication Data

US 2001/0023476 A1 Sep. 20, 2001

Related U.S. Application Data (63) Continuation of application No. 08/918,726, filed on Aug. 21, 1997, now abandoned.

(51) Int. Cl.[7] .................................................. G06F 12/12
(52) U.S. Cl. ......................................... 711/133; 711/134
(58) Field of Search ................................. 711/118, 133, 711/134, 136, 160; 709/213; 725/142, 145

(56) References Cited

U.S. PATENT DOCUMENTS

| | | | | |
|---|---|---|---|---|
| 5,873,100 A | * | 2/1999 | Adams et al. | 707/204 |
| 5,882,757 A | * | 3/1999 | Yashiro | 369/283 |
| 5,889,958 A | * | 3/1999 | Willens | 709/229 |
| 5,892,917 A | * | 4/1999 | Myerson | 709/224 |
| 6,012,126 A | * | 1/2000 | Aggarwal et al. | 711/133 |

* cited by examiner

Primary Examiner—B. James Peikari
(74) Attorney, Agent, or Firm—Howard A. Skaist (57) ABSTRACT

Various methods of caching web resources include caching in accordance with a number of times accessed, a frequency of access, or a duration of access. One method of caching web resources includes the step of accessing a first web resource. The first web resource is cached, if no other web resource is accessed after a pre-determined period of time. Another method of caching web resources includes the step of accessing a first web resource. The first web resource is cached, if the first web resource is subsequently accessed more than a pre-determined number of times. Another method of caching web resources includes the step of accessing a plurality of web resources. The accessed web resources are cached as cached web resources in accordance with at least one of a number of times accessed, a frequency of access, or a duration of access. An apparatus comprises storage media containing caching logic for caching web resources. The caching logic includes instructions to cache selected web resources as cached web resources in accordance with at least one of a number of times accessed, a frequency of access, or a duration of access. The selected web resources correspond to a subset of a plurality of accessed web resources.

3 Claims, 8 Drawing Sheets

METHOD OF CACHING WEB RESOURCES

This application is a continuation of application Ser. No. 08/918,726 that was filed on Aug. 21, 1997, now abandoned.

FIELD OF THE INVENTION

This invention relates to the field of computers. In particular, this invention is drawn to caching web resources obtained from the Internet.

BACKGROUND OF THE INVENTION

The Internet is a worldwide network of computers and computer resources sharing a common communication protocol to facilitate the communication of information between computers that may have different hardware and software architectures including different operating systems and file systems.

The Internet uses a client/server architecture for exchanging information. A client computer requests resources from one or more host computers somewhere on the Internet. These resources may include files or services such as information retrieval services, search services, communication services, and recreational services.

A subset of Internet host computers provide multimedia information services. This subset of host computers support a protocol which permits sharing hypermedia documents between computers having different architectures, operating systems, and file systems. These hypermedia documents can be viewed or accessed using a "browser" application program on the client computers.

The World Wide Web is a wide-area hypermedia information retrieval initiative aiming to give universal access to a large universe of information stored in computers that use different hardware and software architectures. Hypermedia is similar to multimedia except that hypermedia contains "hyperlinks" or simply "links" to other information including text, sounds, images, movies, etc. The information may be embodied in the form of a document. The "web" is virtually formed by these hyperlinks. Thus the "web" refers to a body of information or abstract space of knowledge. Physical access to this body of information is frequently accomplished using the Internet. A hypermedia document viewed using a browser is often referred to as a "web page."

Web pages often contain links to other web resources. For example, a web page may contain a link to another position within the same web page, another web page located somewhere else on the Internet, or links to initiate other services such as searching or file retrieval. These other web resources, for example, can be files designed to produce sounds or movies. The link destination is identified by a Uniform Resource Locator (URL). Every WWW resource located anywhere on the Internet can be identified by a URL.

Using these links within documents, a user may navigate to various web pages located throughout the Internet by following a chain of links. After following a chain of links, a user may need to return to a common page to select another chain of links to follow. This may be the case when exploring a web site or when searching the World Wide Web for sites related to a given topic.

For example, when a client computer issues a search request to a host computer, the host may respond by creating a web page containing links to sites containing information relevant to the user's query. This web page is referred to as the common page. The user may choose to follow a given link from the common page. After reviewing the web page associated with the selected link, the user can typically return to the common page to pursue another link. For example, the user may return to the common page in order to pursue links to other web pages that were indicated as being relevant to a search request.

One disadvantage of current browsers is the lack of sophisticated heuristics for caching web pages and other resources. In one caching scheme the browser caches web pages on a first-in-first out basis. The number of web pages cached is dependent upon the resources (i.e., storage requirements) of each web page as well as the amount of storage set aside for caching web pages. If the common page is not cached, the web browser must access the host's search engine again in order to regenerate the common page.

This caching technique has a number of disadvantages. One disadvantage of this technique is the inefficient use of the host machine resources. In particular, the client computer wastes host computer time by requesting the host computer to regenerate the common web page each time it is accessed. Another disadvantage of regenerating the common page is the time wasted by the client waiting for regeneration and retrieval of the common web page. Yet another disadvantage is the increased Internet traffic associated with reissuing the saved URL and retrieving the generated common page from the host machine's search engine.

SUMMARY OF THE INVENTION

A method of caching web resources includes the step of accessing a first web resource. The first web resource is cached, if no other web resource is accessed after a pre-determined period of time.

Another method of caching web resources includes the step of accessing a first web resource. The first web resource is cached, if the first web resource is subsequently accessed more than a pre-determined number of times.

Another method of caching web resources includes the step of accessing a plurality of web resources. The accessed web resources are cached as cached web resources in accordance with at least one of a number of times accessed, a frequency of access, or a duration of access.

An apparatus includes storage media containing caching logic for caching web resources. The caching logic includes instructions to cache selected web resources as cached web resources in accordance with at least one of a number of times accessed, a frequency of access, or a duration of access. The selected web resources correspond to a subset of a plurality of accessed web resources.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
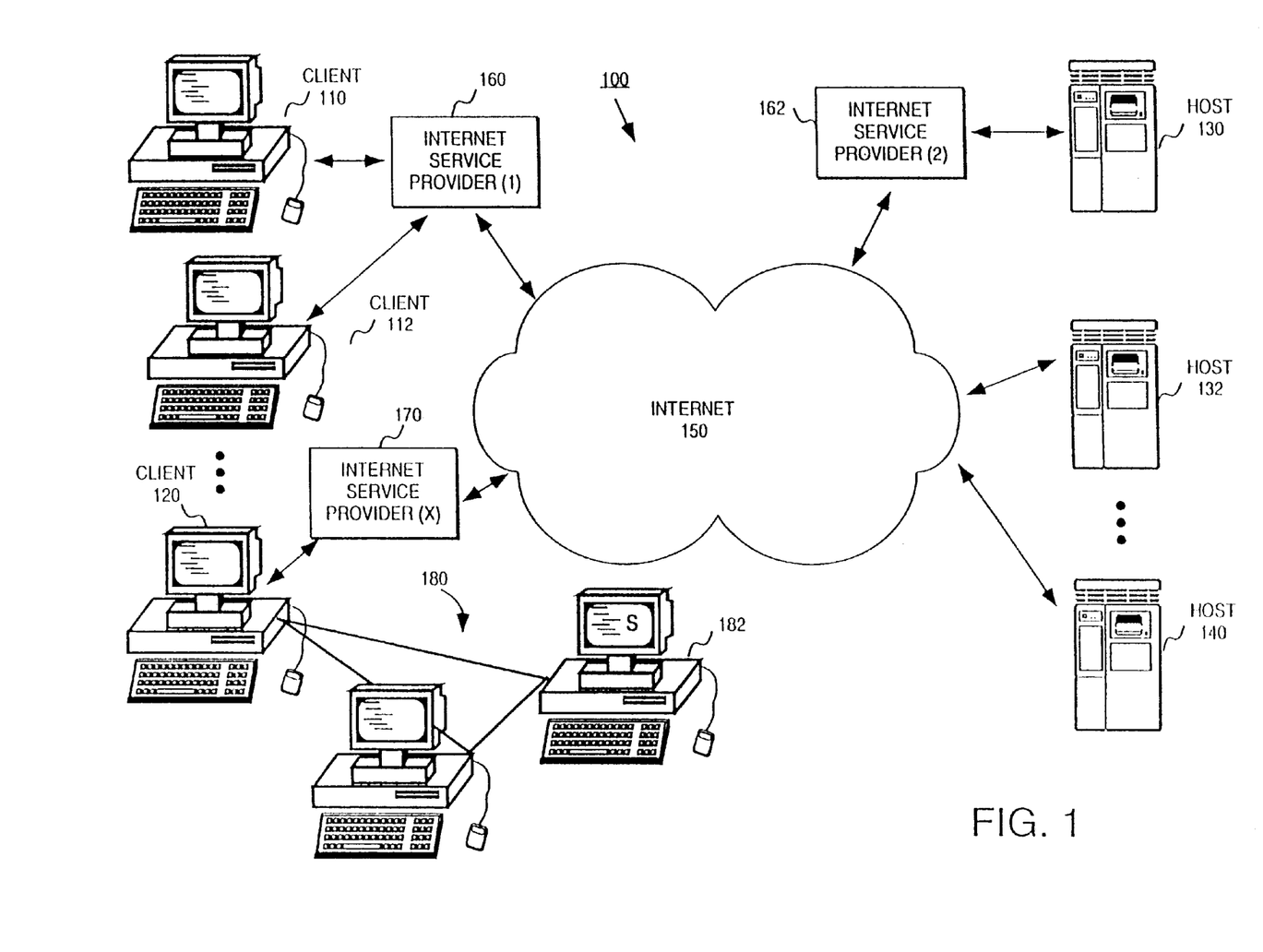
FIG. 1 illustrates a client-server architecture networked computer environment.

FIG. 1 illustrates a network environment 100 including a communication network commonly referred to as the Internet 150. The Internet includes a combination of routers, repeaters, gateways, bridges, and communications links with computers spread throughout the world. The Internet facilitates communication between computers or other devices connected to the Internet.

Some of the computers are referred to as host computers because they provide services upon request. The computers issuing the requests are referred to as client computers.

Network environment 100 includes multiple (N) client computers (110 thru 120) and multiple (M) host computers (130 thru 140).

In one embodiment, computers may use an Internet Service Provider (ISP) to gain access to the Internet. For example, clients 110 and 112 use ISP(1) 160 to access the Internet. Client 120 uses ISP(X) 170 to access the Internet.

Host computers such as hosts 132 and 140, for example, can be directly connected to the Internet. Alternatively, a host computer (e.g., 130) may use an ISP (e.g., 162) to gain access to the Internet.

The host computers (e.g., 130) and client computers (e.g., 110) can be entirely different architectures, however, they can communicate by using a common communication protocol. In one embodiment, this protocol is the Transmission Control Protocol/Internet Protocol (TCP/IP).

Figure 2:
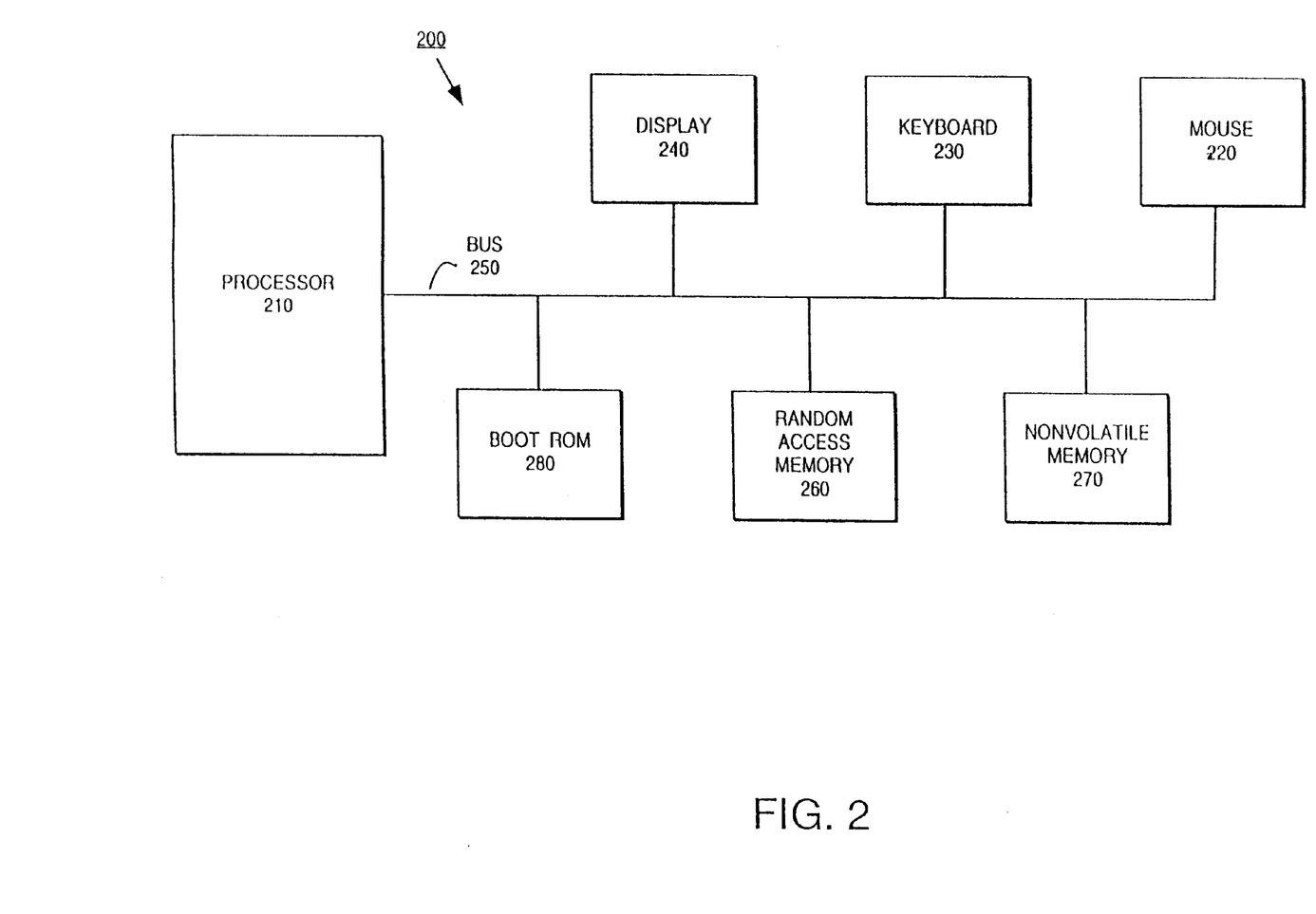
FIG. 2 illustrates one embodiment of a client computer.

FIG. 2 illustrates one embodiment of a client computer architecture. Client computer 200 includes processor 210. Input devices such as mouse 220 and keyboard 230 permit the user to input data to client computer 200. Information generated by the processor is provided to an output device such as display 240. Client computer 200 typically includes random access memory (RAM) 260 which is used by the processor for executing application programs.

In one embodiment, client computer 200 includes nonvolatile memory 270. Nonvolatile memory 270 is used to retain programs and data even when the client computer is powered down. In one embodiment nonvolatile memory 270 is an electromechanical hard drive. In other embodiments, nonvolatile memory 270 might be a solid state disk drive or a flash electrically erasable programmable read only memory (flash EEPROM).

Mouse 220, keyboard 230, RAM 260, and nonvolatile memory 270 are typically communicatively coupled to processor 210 through one or more address and data buses such as bus 250.

The client computer can request services from a host computer. Hosts typically provide services such as file retrieval services, search services, communication services, and recreational services.

For example, Gopher provides information retrieval services. Popular search services include Archie. Veronica is the name of another search service typically used in conjunction with Wide Area Information Servers (WAIS). Communication services include electronic mail, UseNet, Telnet, and Internet Relay Chat (IRC). An example of a recreational service is a Multi-User Dungeon (MUD).

A subset of Internet host computers provide multimedia information services. This subset of host computers permit physical access to the abstract body of information referred to as the World Wide Web (WWW) and are referred to as WWW hosts or WWW servers.

World Wide Web host computers support a protocol which permits users having computers with different architectures, operating systems, and application programs to share multimedia enhanced documents. In one embodiment, this protocol is the Hypertext Transport Protocol ("HTTP"). The multimedia enhanced documents are often referred to as "web pages." The application specific to a given hardware platform that permits viewing the web pages is often referred to as a browser.

Hypermedia enhanced documents typically provide links (i.e., hyperlinks) to other resources in response to selection of an anchor. The anchor is typically a word, group of words, image, or some demarcated area of the document. For graphical-based browsers, the anchor is generally activated by pointing to the anchor and clicking a selection button of a pointing device such as a mouse. For text-based browsers, the anchor is generally activated by using cursor-control keys to select the anchor and pressing another key (e.g., <ENTER>). These anchors and links are defined using a language such as hypertext markup language ("HTML"). The browser interprets an HTML file to display the web page. The HTML file also determines what resource is accessed in response to activation of a given anchor.

Uniform Resource Locators (URLs) provide a standard way of referencing Internet resources including web resources regardless of whether the resource is a document, an image, a movie, a sound, or another web page. A browser, for example, can access a host machine identified by the URL and then retrieve the resource specified by the URL. A uniform resource locator (URL) is a description of an item including the location of the item that is to be retrieved. For example, the location might be the local disk drive or another file at another Internet site. The URL is not limited to other World Wide Web sites and may in fact refer to other Internet protocols and services such as Gopher, WAIS, UseNet news, Telnet, or anonymous FTP (file transfer protocol).

A URL identifies the protocol as well as the location of the item to be retrieved. For example, consider the following URL:

http://www.intel.com/intel/product/index.html

This URL identifies the protocol as "http" ("Hypertext Transport Protocol"). Other protocols include "gopher" (to initiate a Gopher session), "ftp" (to initiate a file transfer), "file" (to retrieve a local file), "wais" (for accessing a WAIS server), "news" (for reading UseNet newsgroups), and "telnet" for initiating a Telnet session.

The portion "www.intel.com" is an Internet host address or symbolic representation of an Internet host address. Thus "www.intel.com" identifies a specific host. The portion of the URL identifying the specific host is often referred to as a web site.

The remainder is a UNIX-style path for the resource that is being accessed. Thus "intel/product/index.html" instructs a browser to retrieve the file index.html from the directory path "intel/product" on the Internet host.

Often a user may simply provide the protocol and Internet host address such as "http://www.intel.com" without explicitly identifying a specific resource. The server software executing on the host machine, however, provides a default resource in response to such a request. In one embodiment, this might be a file named "index.html" or "index.htm" for machines having file systems that do not support longer filename extensions. Thus the use of the web site alone implicitly identifies a default resource. For web pages, this default resource is often referred to as the "home page." Alternatively, the home page may be explicitly defined. Thus the URL either explicitly or implicitly identifies a specific resource, protocol, and host machine on the Internet.

A given web page may be formed from a number of resources identified within the web page's html file. For example, "index.html" contains instructions for generating a hypermedia document for the client. The client's browser interprets the html file in order to produce the corresponding web page. The html file may instruct the client's browser to access any number of other web resources located on the host or elsewhere including bitmap files, files for producing animated video or sound, etc. Each of these resources is identified either explicitly or implicitly by a URL.

Figure 3:
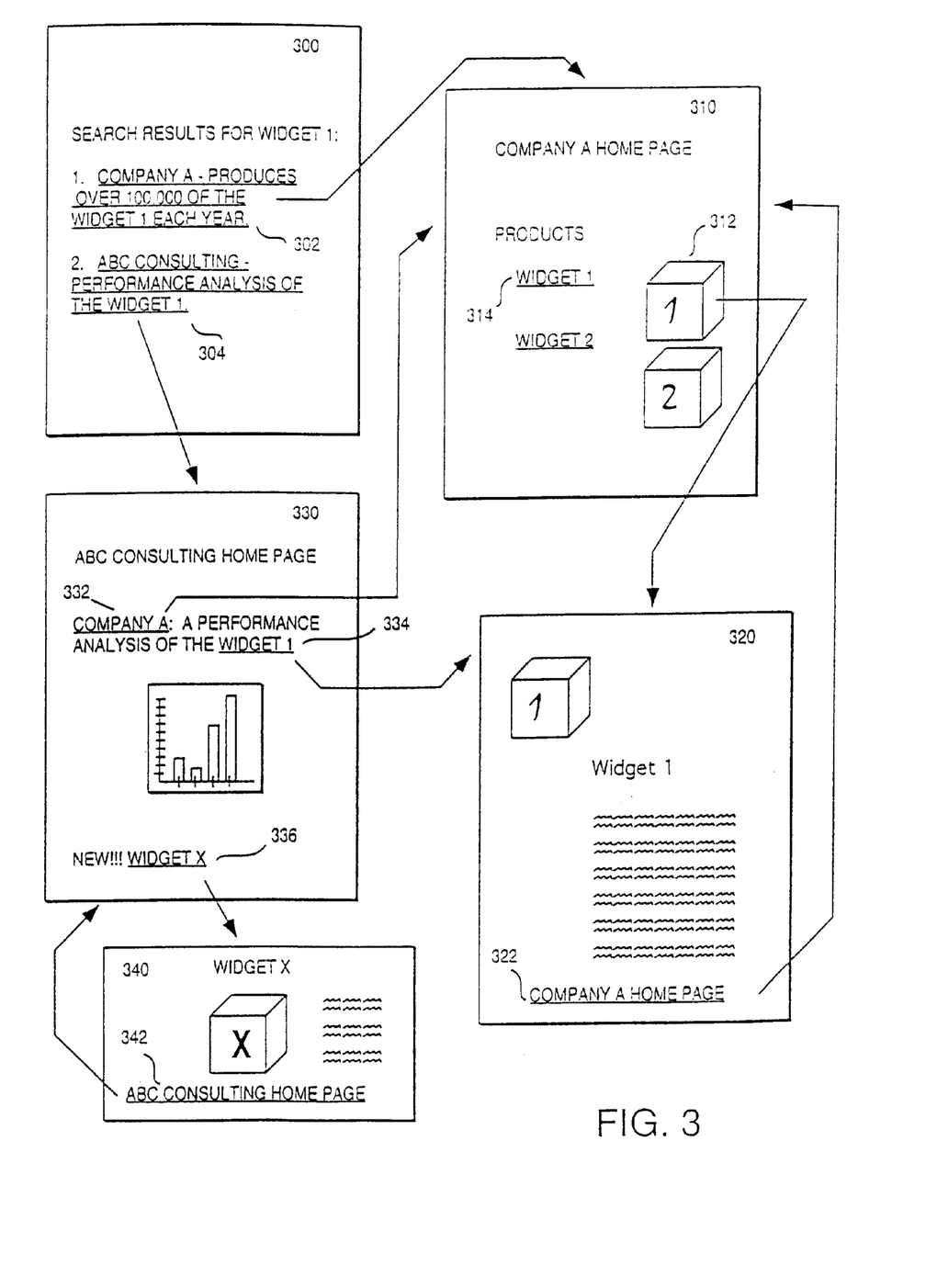
FIG. 3 illustrates a web page and hyperlinks to other web resources.

FIG. 3 illustrates one example of using URLs to access other Internet resources. Web page 300 includes anchors 302 and 304 for accessing other web resources. Anchors are often identified by highlighted text, an icon, or an image on the web page. In one embodiment, the web page is defined using hypertext markup language ("HTML") to describe the text, icons, images, etc. of the web page.

The highlighted text, icon, or image is associated with a URL. This association is the hyperlink. Often the terms "hyperlink" or "link" are used synonymously with the term "anchor." Thus "anchor 302" is equivalent to "link 302," or "hyperlink 302."

Selecting an anchor effectively selects and follows the hyperlink to the resource identified by the associated URL. Selecting anchors 302 or 304, for example, will access other Internet resources that may be physically located in various host computers throughout the Internet. The selection is typically accomplished with a pointing device such as a mouse.

For some applications (i.e., searching) users often re-visit web pages previously visited. For example, the user may have used an Internet search engine to generate a web page containing the results of a search. This resulting web page may contain a number of links to other web pages. Users typically select links one at a time from the resulting web page. After following a given link, the user returns to the resulting web page in order to follow another link suggested by the search engine. Thus the web page resulting from the search may be visited a number of times.

Referring to FIG. 3, web page 300 provides hyperlinks generated as a result of a search. Web page 310 is accessed by selecting hyperlink 302. From web page 310, the user can access web page 320 by selecting anchors 314 or 312. Anchor 312 is an example of using an image or an icon as an anchor. From web page 320, the user can select anchor 322 to return to web page 310. Thus the user can follow or navigate a chain of links by selecting the anchors.

After perusing web pages 310 and 320, the user can return to web page 300 in order to follow another link identified by the search results. For example, the user can return to the search results web page 300 in order to follow the chain of links starting with hyperlink 304. Selection of anchor 304 accesses web page 330. From web page 330, the user can access web page 340 by selecting anchor 336. The user can return to web page 330 by selecting anchor 342 on web page 340. Web page 330 also contains hyperlinks to web page 310. Thus the user can access web page 310 by selecting anchor 332.

Web page 300 may be referred to as the "common page." Web page 300 is the common link to all of the other links contained within web page 300. For example, web page 300 provides access to the chain of links beginning with link 302 and the chain of links beginning with 304 regardless of whether or how those chains might subsequently intersect.

In order to facilitate following links, browsers typically save the URL of the most recently accessed web pages. The user can navigate "forward" and "backward" among their most recently selected web pages even if the web pages do not contain specific links to each other. Thus for example, web page 330 provides a link to web page 310, but the converse is not true. The browser provides means to navigate "backward" and "forward" among the most recently selected web pages. Thus, for example, if web page 310 was accessed from web page 330, the user can return to web page 330 by navigating backward using features of the browser. This type of approach may be necessary in order to return to search page 300 after following a chain of links.

Figure 4:
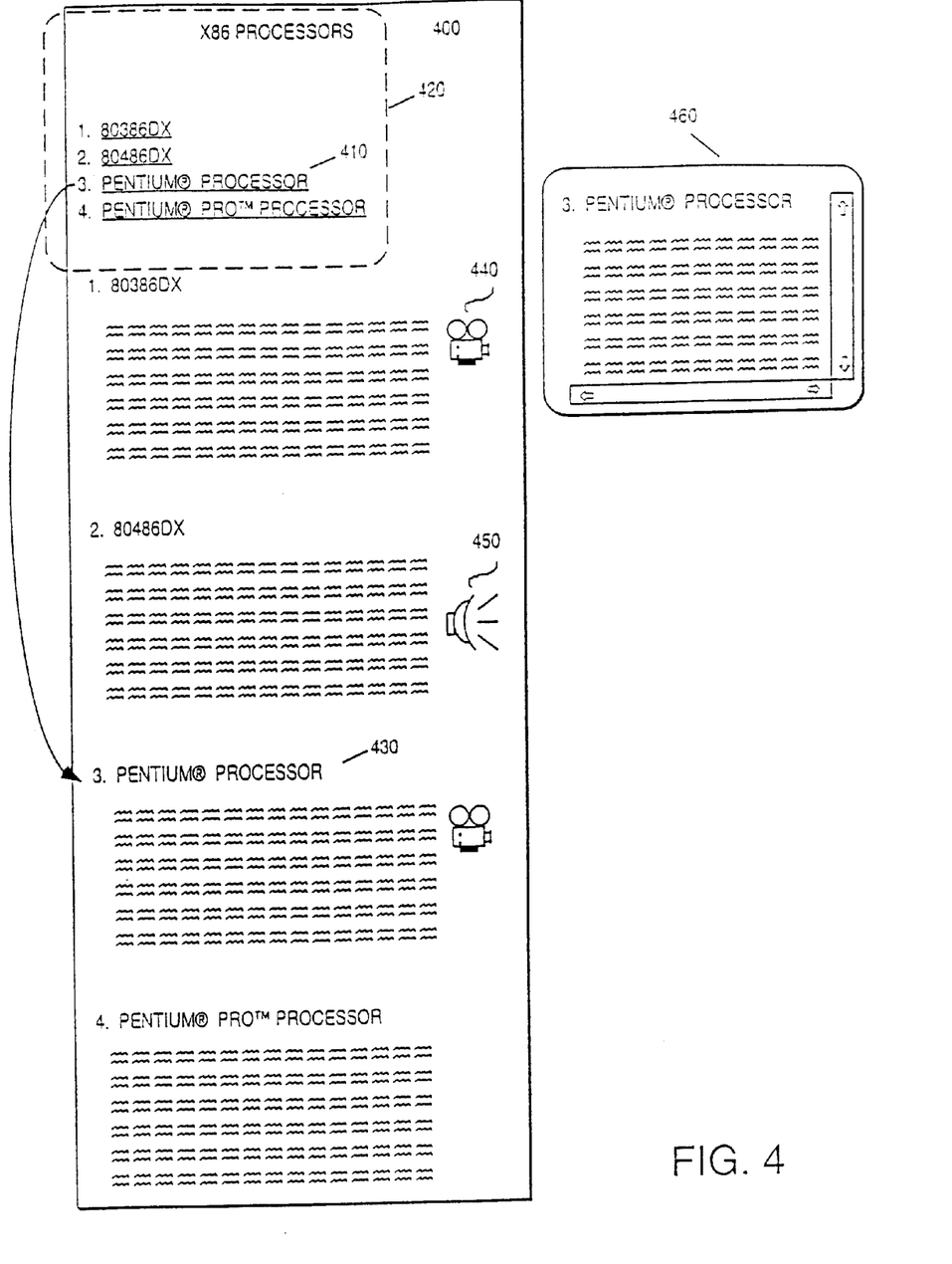
FIG. 4 illustrates navigation within a web page having hyperlinks to itself.

FIG. 4 illustrates an example of following hyperlinks to another location within the same web page. Web page 400 can only be viewed a portion at a time due to the actual size of the display as indicated by outline 420. In addition to text, web page 400 includes anchors 440 and 450 to other resources.

In the illustrated embodiment, anchor 440 is an icon that indicates that selection of anchor 440 will access a movie. In one embodiment, the selection of anchor 440 accesses a file identified by an associated URL. The browser recognizes the file as containing data for generating a movie. The browser either plays the movie in accordance with the data or provides the file to another application in order to play the movie.

Anchor 450 is an icon that indicates that selection of anchor 450 will access a sound. In one embodiment, the selection of anchor 450 accesses a file identified by an associated URL. The browser recognizes the file as containing data for generating sound. The browser either interprets the data to generate the sound or provides the file to another application in order to generate the sound.

Web page 400 also provides an index to other locations within the same web page. Selecting anchor 410, for example, repositions the web page 400 within the viewing area of the display so that the user might see view 460. Due to the physical limitations of the displayable area, the browser typically provides a method of scrolling (e.g., scroll bars) so that the user may navigate within the same web page by scrolling.

The process of accessing a host machine and retrieving the specified resource in accordance with the URL may take a considerable amount of time. In an effort to decrease the time spent waiting to download web pages, browsers typically have a cache feature for caching web pages. When a URL specifies a web page that has previously been cached, the browser may retrieve the cached version of the web page instead of accessing the host machine again when re-visiting the web page.

One caching mechanism attempts to cache every web page accessed. Web pages are cached on a first-in-first-out basis so that the most recently accessed non-cached web page can be cached.

One disadvantage of this method is inefficient usage of the cache may result in excessive storage set aside for the cache. For example, web pages that are not likely to be re-visited are cached. Due to size constraints of the cache, frequently re-visited web pages or web pages with a high likelihood of being re-visited, such as common pages, might be flushed from the cache in order to permit caching the most recently accessed web page. In order to provide a greater likelihood that frequently visited web pages remain within the cache, the cache size may be increased. Increasing the cache size, however, consumes computer resources that could otherwise be allocated for other purposes.

Figure 5:
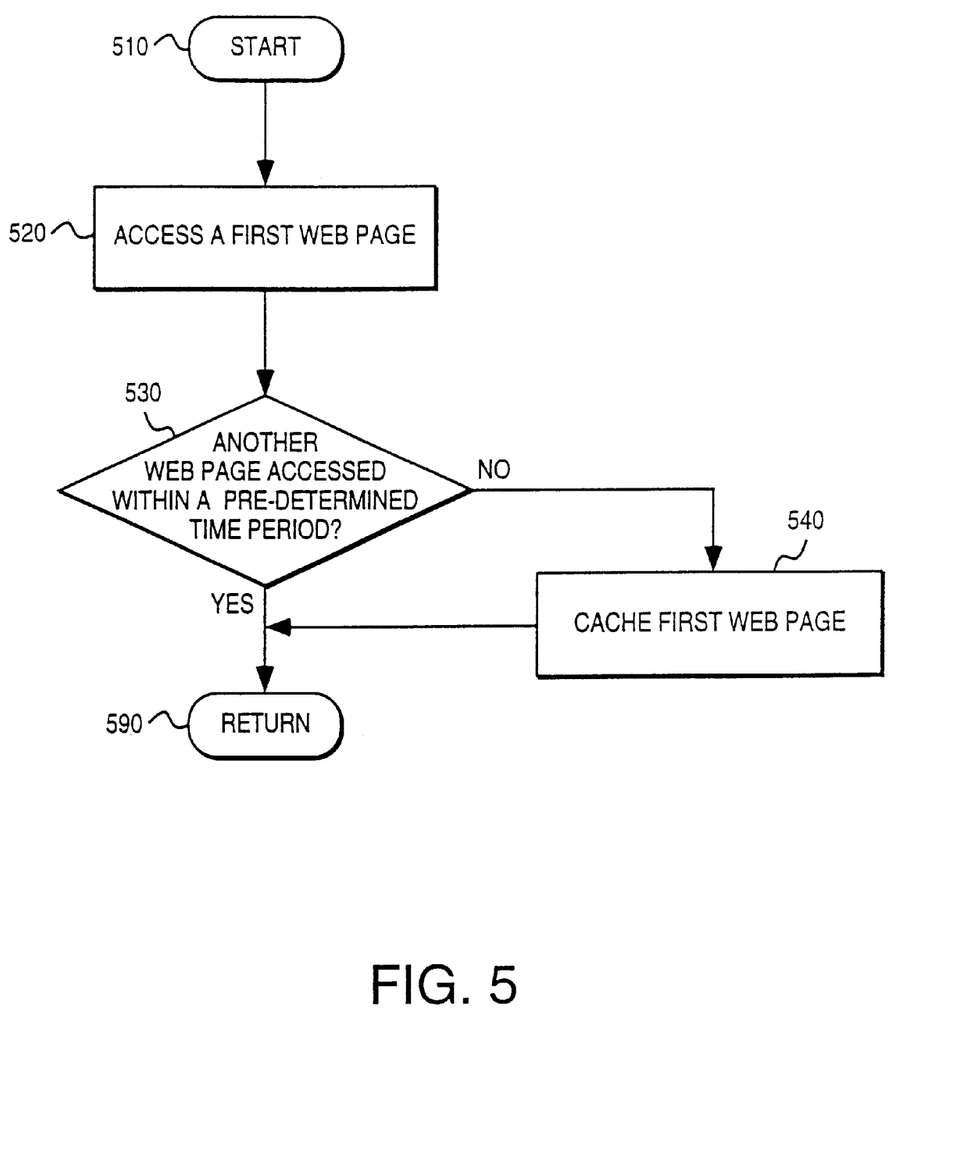
FIG. 5 illustrates one embodiment of a method of caching web resources such as a web page.

FIG. 5 illustrates a method of caching web resources based on the length of time spent browsing the web resource. In the embodiment illustrated in FIG. 5, the web resource is a web page.

The method of caching web resources begins with step 510. A first web page is accessed in step 520. If no other web page is selected after a pre-determined period of time as determined in step 530, then the first web page is cached. Otherwise the first web page is not cached and processing is completed in step 590.

In one embodiment, the first web page is automatically cached after the pre-determined time period has elapsed, if no other web page is selected.

In an alternative embodiment, the first web page is cached only when a second web page has been selected after a pre-determined time period.

Figure 6:
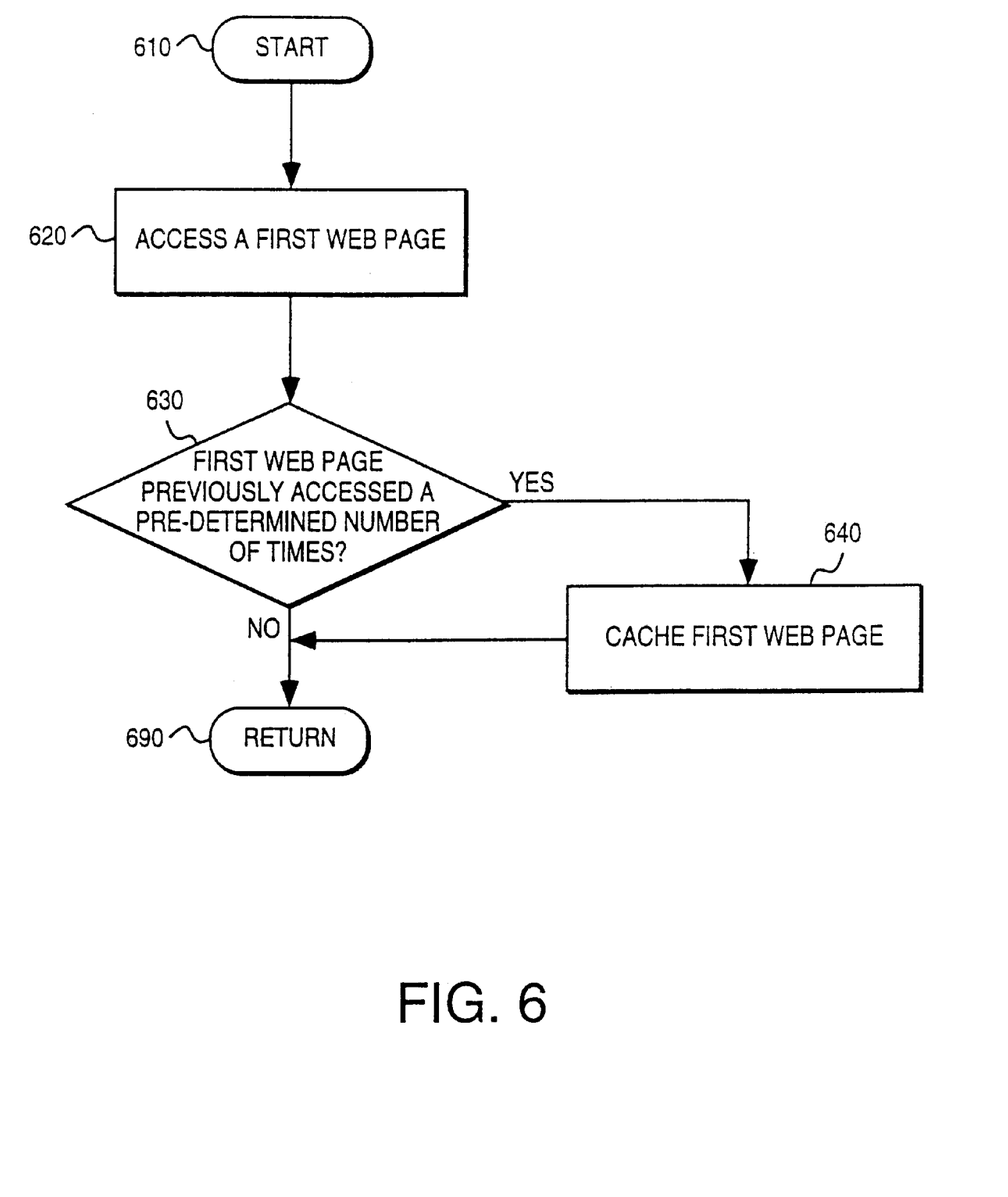
FIG. 6 illustrates an embodiment of another method of caching web resources such as a web page.

FIG. 6 illustrates another method for caching web resources based on the number of visits to a given web resource. In this embodiment the web resource is a web page.

The method of caching web pages begins with step 610. A first web page is accessed in step 620. If the same web page was previously accessed a pre-determined number of times as determined by step 630, then the web page is cached in step 640 and processing is completed in step 690. Thus after the initial access, the first web page is cached if it is subsequently accessed more than a pre-determined number of times.

Various techniques may be used to track the number of times a particular web resource is accessed. For example, a table may be used. The table entries are indexed by a unique key such as the complete, explicit URL for each web resource. When a web resource is accessed, the table is scanned to determine if that web resource already has a corresponding entry in the table by searching for that web resource's URL in the table. If the web resource has not previously been accessed, then a new entry in the table is created using that web resource's URL. If the web resource has previously been accessed (as determined by scanning the table) then a count field associated with that web resource's URL in the table is incremented to reflect another access has been made.

In one embodiment, a resource such as an html file might instruct the browser to generate a web page from a number of other resources. In such a case, an entry is created in the table for each web resource accessed.

In one embodiment, the count field is incremented only if the subsequent accesses are interleaved with accesses to other web resources. Thus if the web resource being tracked is a web page, consecutive accesses that merely reposition the web page within the display do not increase the count. Visiting another web page and subsequently returning to the first web page will, however, increase the count.

In one embodiment, the table and cache are erased and re-initialized upon starting the browser application. Thus web resources are cached based upon the number of times accessed within a given browsing session. If this is the case, then the table is effectively a frequency table. In other words, the web resource is cached if the same resource is accessed more than a predetermined number of times within a given browsing session. Thus the web resource is cached based upon frequency of access.

In an alternative embodiment, the table and cache are erased and re-initialized when requested by the user. Thus web resources may be cached based upon the total number of times accessed independent of the number of browsing sessions.

In yet another embodiment, the table provides for tracking the relative age of the cached web resource. If the resource has remained in the cache beyond a pre-determined period of time, then the table entry for that resource may be invalidated and the resource may be flushed from the cache. The relative age may be tracked in the table by providing an additional field and storing the date and time that the corresponding resource was cached. Alternatively, the field stores a value that permits determining in what order the resources were cached.

Some browsers "cache" resources as they are being downloaded from a host. The methods described above may be applied to determine when and if resources should be flushed from the cache as opposed to whether they are cached. In other words, the methods described above can be used to determine the persistence of resources stored in the cache.

For example, consider a browser that caches resources as they are downloaded. In one embodiment, the methods described above are applied to determine which resources should remain in the cache when a triggering event initiates flushing of at least a portion of the cache.

In one embodiment, a triggering event is when the browser starts. In another embodiment, exiting the browser application is a triggering event. In another embodiment, flushing of at least a portion of the cache is initiated when the cache reaches a pre-determined size. In yet another embodiment, flushing of at least a portion of the cache is initiated whenever the cache has less than a pre-determined percentage of available space left.

Thus "caching" in the context of cache persistence means allowing the resource to stay in the cache. Application of the methods described above to cache persistence permits applying the rules described above across multiple browser sessions.

For example, a resource that is accessed infrequently during a given browser session may persist in the cache under the total number of accesses rule, if a sufficient number of accesses occur before a triggering event flushes the resource, even if the accesses are accumulated over more than one browser session. In one embodiment, the count field associated with the URL of a given resource is incremented each time the given resource is accessed. If the value in the count field is less than a pre-determined value when the triggering event occurs, then the resource is flushed from the cache.

Thus one method of persistence caching includes the step of caching at least one web resource of a plurality of web resources accessed during a plurality of browser sessions. A count of the number of accesses to each cached web resource is computed. Selected cached web resources are flushed in response to a triggering event, if the corresponding count is less than a pre-determined value.

Similarly, the table may include a "session" field to aid in tracking an average frequency of access across multiple browser sessions. Thus each time the browser is started up, the session field is incremented for all URL entries. The count field is incremented for a given URL whenever access is made to the resource identified by the given URL. When a triggering event occurs, the average frequency of access can be calculated $$\left(\text{e.g., } \frac{\text{count}}{\text{sessions}}\right)$$

for each URL to determine if the resource identified by the given URL should remain in the cache or be flushed. If the average frequency of access for a given URL is less than a pre-determined value at the time a triggering event occurs, then the identified resource is flushed.

Thus another method of persistence caching includes the step of caching at least one web resource of a plurality of web resources accessed during a plurality of browser sessions. An access count of the number of accesses to each cached web resource is computed. A session count of the number of sessions a selected web resource is accessed is computed. Selected cached web resource are flushed in response to a triggering event, if the corresponding average frequency of access determined by dividing the corresponding access count by the corresponding session count is less than a predetermined value.

The duration of access rule may also be used in the cache persistence context. The table may be modified to include a "duration" field. When accessing a given resource, the length of time spent without accessing any other resource is measured. This length of time is then added to the duration field. The duration field thus indicates the accumulated time spent on the given resource. When a triggering event occurs, the given resource is flushed unless the accumulated time in the duration field exceeds a pre-determined value.

Thus a duration of access for persistence caching includes the step of caching at least one web resource of a plurality of web resources accessed during a plurality of browser sessions. A length of time spent without accessing any other resource is accumulated for each cached web resource. Selected cached web resource are flushed in response to a triggering event, if the corresponding accumulated length of time is less than a pre-determined value.

In one embodiment, regardless of the caching rule applied, the table entry identifying a given resource is deleted or marked invalid once the given resource is flushed.

Referring to the client computer architecture illustrated in FIG. 2, various storage media may be used for caching the web resources. For example, in one embodiment, the web resource is cached in RAM 260.

In an alternative embodiment, the web resource is cached using nonvolatile storage such as nonvolatile memory 270. In one embodiment, nonvolatile memory 270 is a solid state disk. In another embodiment, nonvolatile memory 270 is flash electrically erasable programmable read only memory.

When a web resource is cached it must be mapped to its corresponding full URL. Otherwise a "name collision" may occur, for example, if resources with the same name (e.g., "index.html") are downloaded from different sites.

This can be accomplished by caching the web resource and identifying it directly by its full URL. In one embodiment, the full URL is expressed as a property of the file. Thus the file can be renamed to avoid name collisions, but identified for subsequent retrieval by examining the file properties of the cached files.

In another embodiment, each entry of the caching table includes a field to identify the name of the resource as cached. Thus if the resource must be renamed due to a name collision, the name as cached is readily available from the same table that indicates whether the resource was cached.

In another embodiment, a separate mapping table can be used to map files as cached to their corresponding full URLs.

The web resource need not be cached locally on the client computer. Referring to FIG. 2, for example, client 136 residing on local area network 140 may cache the web resources on local area network server 144.

FIGS. 5 and 6 effectively indicate conditions that determine if an accessed web resource should be cached, but not when the accessed web resource should be flushed. Accessed web resources can be flushed as the need arises, if they are not cached or have not been selected for caching. Eventually, even cached web resources may need to be flushed in order to permit caching additional web resources. In one embodiment, cached web resources are flushed on a first-in, first-out basis. In this embodiment, the use of a relative age field, as described above, permits tracking the order in which web resources were cached for purposes of determining the order in which they should be flushed.

Thus methods of caching web resources based on duration of access, number of times accessed, and frequency of access have been described. Various embodiments may combine these methods of caching. In particular, the browser may be configured to apply caching rules in accordance with the type of resource. For example, image files may be associated with one caching rule. Text files might be associated with a different caching rule. In addition, once the determination is made whether a resource should be cached, the resource may be cached at that time or in response to a request to access another resource.

Figure 7:
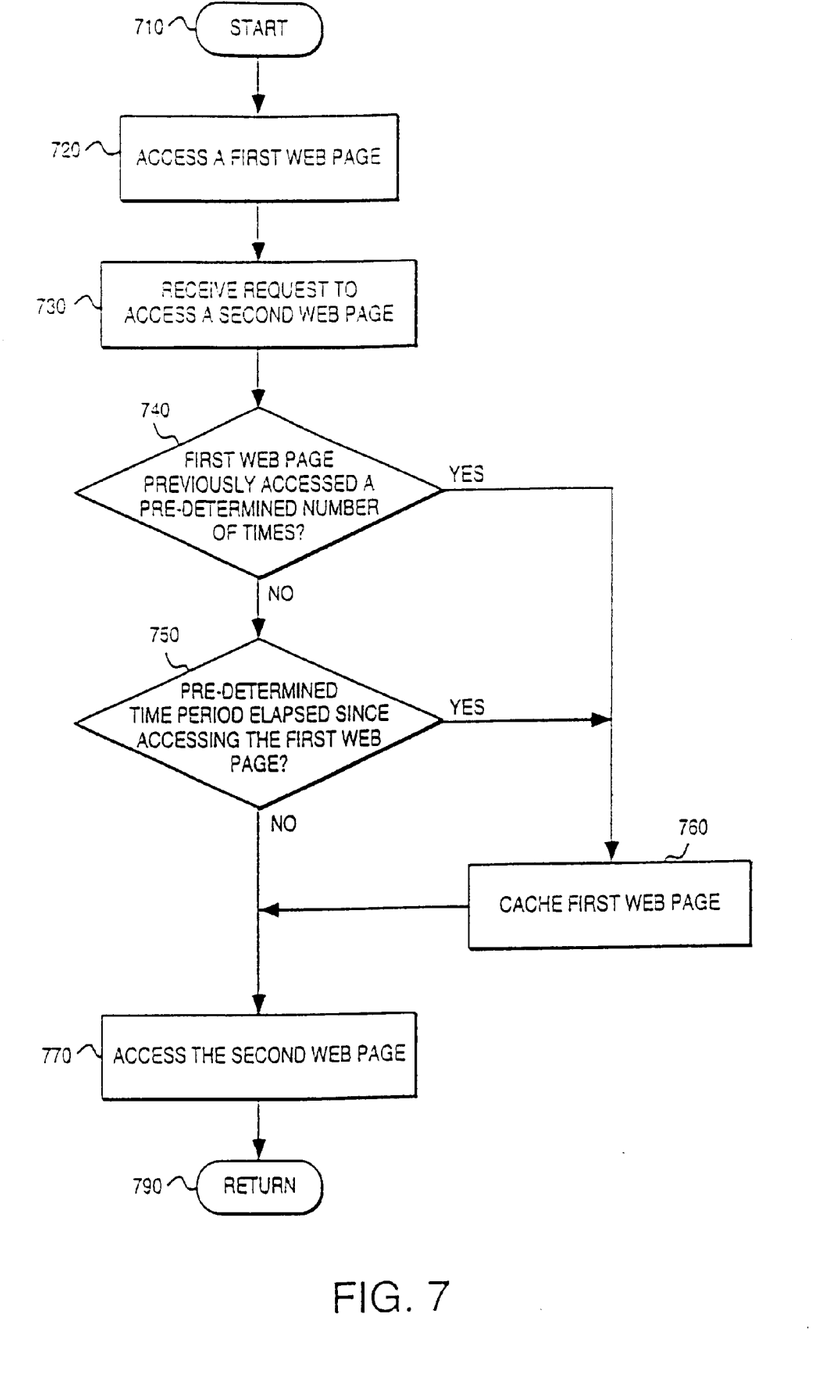
FIG. 7 illustrates a method of caching a first web resource such as a web page after a request to access a second web resource is received.

FIG. 7, for example, combines the methods presented above for determining if a web resource is selected for caching. The web resource is not cached, however, until a request to access another web resource is received. The method begins with step 710 using web pages as examples of web resources.

In step 720, a first web page is accessed. In the embodiment illustrated in FIG. 7, this first web resource or web page is not presently being cached.

In step 730, a request to access a second web page is received. In this context, the second web page is a web resource other than the first web page. Thus selecting an anchor on the first web page in order to reposition the first web within the display is not considered to be receiving a request to access another web resource or a "second" web page.

After a request to access a second web page is received, the method makes the determination of whether the first web resource should be cached in steps 740 and 750. In particular, if the first web page was previously accessed a pre-determined number of times, as determined in step 740, then the first web page is cached in step 760. Alternatively, if a pre-determined time period has elapsed since accessing the first web page as determined in step 750, then the first web page is cached in step 760.

The requested resource, (i.e., the second web page) is not accessed until step 770. Thus the second web page is not accessed until either 1) a decision is made not to cache the first web page, or 2) a determination is made to cache the first web page and the first web page is cached.

FIG. 7 thus combines the methods of caching based on a duration of access and a number of times the resource is requested. The resource is not cached until a request to access another resource is received.

Figure 8:
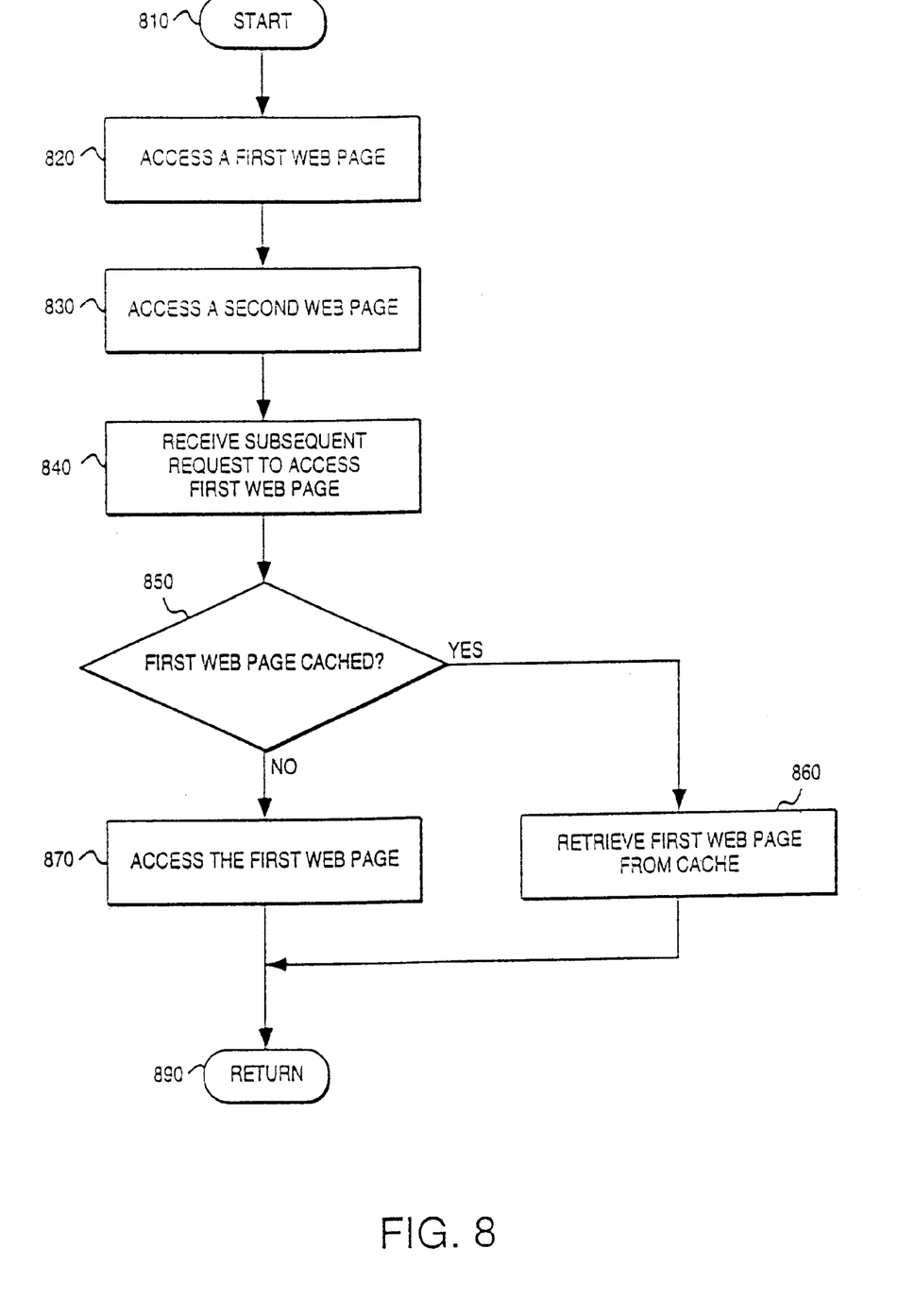
FIG. 8 illustrates retrieval of cached web resources such as web pages.

FIG. 8 illustrates one embodiment of a method of retrieving a cached web resource. In step 810 a request is made to access a web resource, in particular a web page. Step 820 determines if the requested web page is in the cache. If the web page is not in the cache, then the web resource is retrieved from the Internet in step 840. If, however, the web page is cached, then the browser retrieves the cached version of the web page instead of the actual web resource in step

830. Various embodiments may permit the user to "refresh" the web page by retrieving it again from the host computer instead of retrieving the cached version of the resource.

In one embodiment, the methods described above are implemented as a series of instructions within a program. The program may be implemented in software, firmware, or hardware.

The firmware or hardware implementations may be particularly suited for systems designed specifically to support Internet tools and applications, and communication protocols. These machines are referred to as NC ("network computer") machines.

One example of such a machine is the NC manufactured by Oracle Corporation, Redwood Shores, Calif. The NC machines achieve hardware costs lower than that of a typical personal computer by offering few capabilities other than the ability to "browse" the Internet. As a result, the machines typically do not have standard peripherals such as floppy disk drives, hard disk drives, or optical disk drives, etc. Other resources such as memory may be somewhat less than that found on a more versatile typical personal computer.

The methods described above may be particularly suited for machines with such limited resources. The instructions for implementing the methods described above may be stored within ROM, flash memory, or some other nonvolatile memory within the NC hardware.

The software implementation may be incorporated within another application program. In one embodiment, for example, the instructions may be included as part of the browser. In another embodiment, the instructions may be part of the operating system. The software itself may be stored or distributed on any variety of storage media including optical disks, magnetic disks, tapes, etc.

The methods described above are also applicable to "intranets." An intranet is typically considered to be a network used within a business entity such as a corporation. Although the intranet is usually intended for internal use only, the business organization may permit the outside Internet community to access all or a part of the intranet.

An intranet uses the same communication protocols and tools as the Internet. Thus in one embodiment an intranet supports TCP/IP and Internet tools on an organization's local area network (LAN) or wide-area network (WAN). With reference to FIG. 1, LAN 180 is an intranet in one embodiment. The intranet offers the ability to leverage the availability all of the tools and applications available for the Internet for the business organization's exclusive use with its own network system.

Thus, for example, different divisions within a corporate entity can create their own web pages to announce employment opportunities, new product offerings, etc. The intranet web page might provide a front-end interface to other information systems within the organization. This could permit, for example, a finance or accounting division to retrieve accounting information stored in a mainframe by using the web page as a front-end for accessing a mainframe database. The use of the caching methods described above may tend to improve response time at each client computer. In addition, caching at each client computer tends to reduce overall intranet traffic, thus leaving even more resources available for handling additional clients or further improving the responsiveness to intranet client requests.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus comprising:

storage media for containing caching logic for caching web resources, wherein the caching logic includes instructions to cache selected web resources in accordance with a length of time spent on a selected web resource wherein the selected web resource corresponds to a subset of a plurality of accessed resources and wherein an accessed web resource is selected for caching if no other web resource is accessed after a predetermined period of time.

2. The apparatus of claim 1 further comprising:

a cache, wherein the caching logic includes instructions to retrieve a cached web resource from the cache in response to an access request for a previously accessed web resource, if the cached web resource corresponds to the previously accessed web resource.

3. The apparatus of claim 1 wherein the instructions form a portion of at least one of an operating system and a browser.

* * * * *